April 28, 1931.   H. A. HICKS   1,802,915
AIRPLANE CONSTRUCTION
Filed May 6, 1930
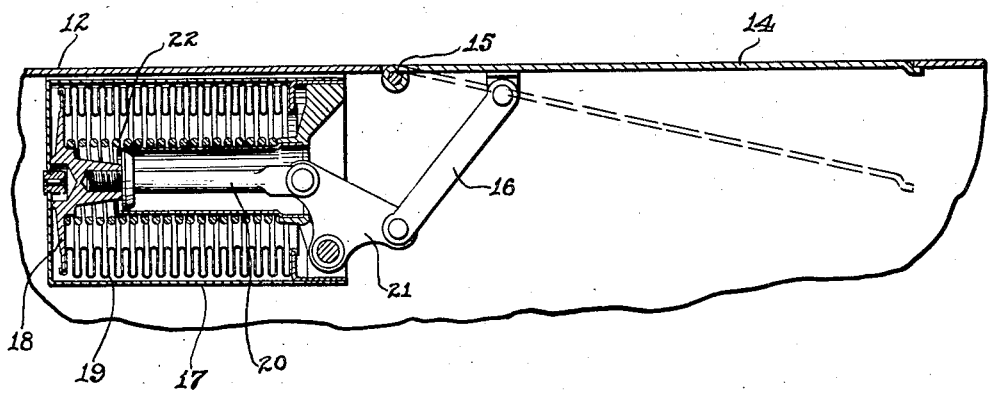
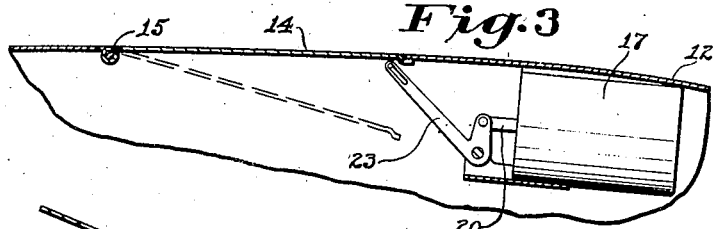
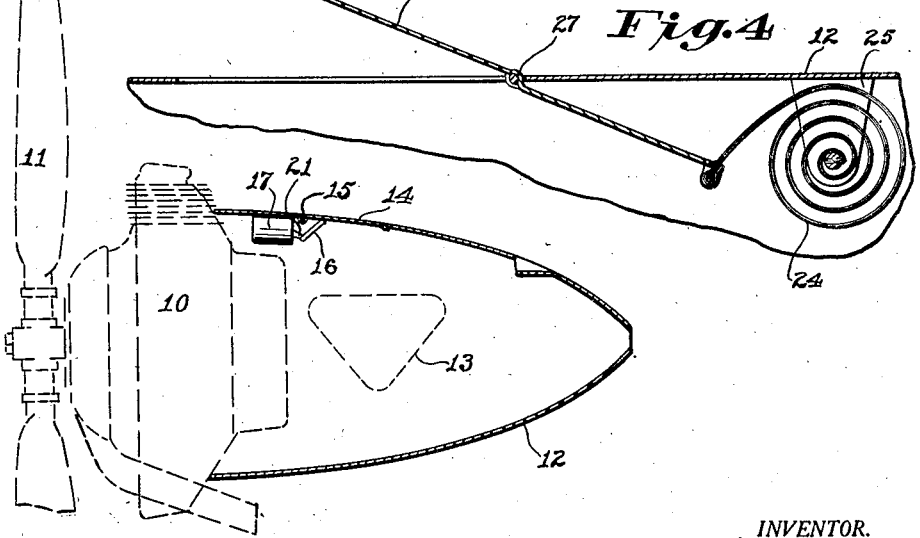
INVENTOR.
H. Q. Hicks.
BY
ATTORNEY.

Patented Apr. 28, 1931

1,802,915

UNITED STATES PATENT OFFICE

HAROLD A. HICKS, OF DETROIT, MICHIGAN, ASSIGNOR TO FORD MOTOR COMPANY, OF DEARBORN, MICHIGAN, A CORPORATION OF DELAWARE

AIRPLANE CONSTRUCTION

Application filed May 6, 1930. Serial No. 450,147.

The object of my invention is to provide an airplane construction wherein automatic means are provided for cooling the engine lubricating oil to a constant temperature thereby prolonging the life of the engine and contributing to its reliability. It has been general practice in airplane construction to provide an oil reservoir or sump for the engine oil and to place this device in a position so that it would be cooled by radiation. This device being mounted in one position had the disadvantage that in cold weather the oil temperature was too low while in hot weather the oil temperature was too high.
In my improved construction the engine oil is maintained at a constant temperature so that better lubrication results.

Means are shown herein whereby the oil reservoir is placed within the engine stream lining or nacelle and whereby this compartment is maintained at a uniform temperature to thereby uniformly cool the oil reservoir under all conditions. The advantage of regulating the oil temperature by such device is apparent because the oil lines, oil reservoir, or any of the other engine parts are in no way molested or altered, the device operating entirely independent of the oiling system of the engine.
With these and other objects in view my invention consists in the arrangement, construction, and combination of the various parts of my improved device, as described in the specification, claimed in my claims, and illustrated in the accompanying drawings, in which:

Figure 1 shows a vertical central sectional view through my improved engine nacelle showing its position in relation to the airplane engine.

Figure 2 shows an enlarged sectional view of a gas expanding temperature controlling device, as shown in Figure 1.

Figure 3 shows an alternate method of installing the temperature controlling device, shown in Figure 2, and Figure 4 shows a temperature controlling device in which a bimetal heat responsive element is used.
Referring to the accompanying drawings, I have used the reference numeral 10 to indicate generally an airplane engine of the radial type having a propeller 11 secured to the forward end of the crank shaft. A conical shaped engine nacelle 12, formed from sheet metal, is secured to the rear of the engine 10 and extends rearwardly to effectively streamline the engine. Disposed within this nacelle 12 I have provided an oil reservoir 13 which is connected to the engine so that the engine lubricating oil is circulated through this reservoir, the oil being pumped from the reservoir 13 to the bearing surfaces and back to this reservoir during the normal operation of the engine.

It will be noted that the reservoir is cooled by direct radiation into the air within the nacelle so that controlling the temperature of this air will control the temperature of the oil. I have, therefore, provided means whereby the air within the nacelle 12 is maintained at an approximately uniform temperature, which temperature will cool the oil within the reservoir 13 sufficiently so that efficient engine operation will be obtained in all kinds of weather.

Referring to Figures 1 and 2, I have provided a louver 14 hinged at 15 to one of the side members of the nacelle 12. This louver 14 is arranged to open inwardly and a link 16 is pivotally secured thereto to so operate the louver. I have provided a cylindrical casing 17 secured to the inside of the nacelle just forwardly of the louver 14 having a diaphragm 18 and bellows 19 mounted therein. A rod 20 extends rearwardly from the diaphragm 18 within this casing and is pivotally connected to one arm of a bell crank lever 21. This bell crank is fulcrumed at one side of the casing 17 and the link 16 is pivotally connected with the free arm of this lever. Thus, when the diaphragm 18 is moved forwardly it swings the bell crank 21 which operates the link 16 to open the louver 14. A coil spring 22 extends between the casing 17 and the diaphragm 18 to urge the louver 14 into its closed position at all times.

A suitable temperature responsive gas is injected into the casing 17 between the bellows 20 and the diaphragm 18. This gas is so compounded and compressed that it will remain in a liquid state until a temperature corresponding to the desired nacelle temperature is reached, at which temperature it will expand into a gas so as to operate the diaphragm 18 thereby opening the louver 14.

For a considerable period after the engine is put in operation the louver 14 will remain in its closed position and the oil in the reservoir 13 will gradually increase in temperature to thereby gradually warm the air within the nacelle 12. However, when the oil in the reservoir 13 attains the desired temperature the nacelle 12 will be heated to an extent sufficient to expand the gas in the casing 17 thereby opening the louver 14 which allows cool air to enter the nacelle. The admission of such air into the nacelle lowers the air temperature therein and causes the gas in the casing 17 to condense to thereby close the louver 14.

This cycle is repeated as often as it is necessary to maintain the temperature of the air in the nacelle 12 substantially constant and, as the radiation from the reservoir 13 depends upon the temperature of the air within this nacelle, a substantially uniform temperature of oil in this reservoir is maintained.

If desired, the casing 17 may be installed, as shown in Figure 3, wherein a bell crank 23 is provided which directly operates the louver 14.

Referring to Figure 4, I have shown a bi-metal temperature responsive element 24 formed as a spiral having its inner end anchored in a bracket 25, which bracket is secured to the side of the nacelle 12. The free end of this coil is directly connected to one end of a pivoted louver 26 which is fulcrumed at 27 in the wall of the nacelle 12. The construction and operation of this coil 24 is well known it being composed of two strips of dissimilar metals, such as steel and brass, invar and steel, or invar and brass. A pair of these dissimilar metal strips are fused or riveted together and wound in a spiral to form the coil 24. The difference in expansion between the metal of the two strips causes the coil 24 to wind or unwind thereby operating the louver 25 to open or close the louver 26.

The novel feature of this device is not in the construction of the heat responsive elements but rather in the arrangement of parts whereby the air within the nacelle 12 is automatically maintained at a uniform temperature to thereby cool the engine oil to a predetermined temperature. The chief advantage gained by this arises because the engine oil is maintained at a substantially uniform temperature thereby prolonging the life of the engine and securing a greater degree of reliability therein.

Some changes may be made in the arrangement, construction, and combination of the various parts of my improved device without departing from the spirit of my invention and it is my intention to cover by my claims such changes as may reasonably be included within the scope thereof.

I claim as my invention:

In an airplane construction, an outboard engine nacelle having an oil reservoir disposed therein, a radial engine mounted at the front of said nacelle, the lubricating oil for which is circulated through said reservoir, a louver intermediately hinged in the side of said nacelle having its forward end projecting outwardly into the engine slip stream and its inner end projecting into said nacelle, and a bi-metal temperature responsive element disposed within said nacelle having one end anchored to the nacelle and the other directly connected to the inwardly projecting end of the louver said element being disposed in the air stream which is deflected into the nacelle by said louver, whereby the opening of said louver will be governed by the temperature within the nacelle and the closing thereof by the temperature of the incoming air.

May 1, 1930.

HAROLD A. HICKS.